United States Patent [19]

Ueyama

[11] Patent Number: 4,751,383

[45] Date of Patent: Jun. 14, 1988

[54] METHOD AND APPARATUS FOR DETECTION OF POSITION WITH CORRECTION OF ERRORS CAUSED BY ERRORS IN SCALE PITCH

[75] Inventor: Tutomu Ueyama, Yawata, Japan

[73] Assignee: Dainippon Screen Mfg. Co., Ltd., Kyoto, Japan

[21] Appl. No.: 846,519

[22] Filed: Mar. 31, 1986

[30] Foreign Application Priority Data

Apr. 2, 1985 [JP] Japan .................................. 60-70507

[51] Int. Cl.⁴ .............................................. H01J 3/14
[52] U.S. Cl. .......................... 250/237 G; 250/231 SE
[58] Field of Search .............. 250/561, 237 R, 237 G, 250/231 SE; 340/347 P; 356/373, 374, 375

[56] References Cited

U.S. PATENT DOCUMENTS 4,488,237 12/1984 Aronson et al. .............. 250/231 SE
4,636,079 1/1987 Rieder et al. .................... 250/237 G

*Primary Examiner*—David C. Nelms
*Assistant Examiner*—Jessica Ruoff
*Attorney, Agent, or Firm*—Lowe, Price, Leblanc, Becker & Shur

[57] ABSTRACT

A method for detecting a position wherein a signal outputted from a position detecting scale is detected by at least two detectors, an output value of a preceding detector of these two detectors is stored anew at the time when an output value of a following detector of the two detectors comes near a scale position on which the output value of the preceding detector is once stored and becomes equal to the output value of the preceding detector, and a position detecting signal is outputted, these steps being repeated to detect the position.

10 Claims, 6 Drawing Sheets

METHOD AND APPARATUS FOR DETECTION OF POSITION WITH CORRECTION OF ERRORS CAUSED BY ERRORS IN SCALE PITCH

BACKGROUND OF THE INVENTION

1. Field of the Invention

The present invention relates to a method for detecting a position of an object by detecting a signal from a scale serving as a reference for a linear encoder, a rotary encoder, etc., and more particularly to a method for detecting a position so as to receive a position detecting signal which is not affected by pitch error of a scale.

2. Prior Art

According to known methods for detecting a position, photoelectric elements read an occulting light or a moire pattern for each pitch of an optical scale or a moire scale, each such pitch serving as a reference of a linear encoder, a rotary encoder etc., Alternatively one pitch of an electric or magnetic scale is detected by inducing voltage in order to detect a moving direction of a measuring object, finally detecting a position thereof. In other words, a pitch scale of various scales is detected by an optical sensor, an electrical sensor, a magnetic sensor, etc., and a position is detected based on signals detected by these sensors.

In this way, according to the known methods, since the scale to be used as a reference is read by photoelectric or magnetic means and the read information is detected and operated to output a position signal, it is required to minimize error of the scale itself in order to improve a position detecting accuracy. However, even if the error of scale itself is minimized, in case of a cylindrical drum rotary type scanner, for example, another erroneous factor due to rotation of a drum may be a problem since a signal of an encoder coupled coaxially with the drum is used to obtain a main scanning position signal. In other words, since the drum is a rotational body, a little radial swing cannot be avoided, and some error in a recording position on the drum surface is inevitably caused by this radial swing. Moreover, since the drum is connected with the encoder by coaxial coupling in this kind of scanner, an accurate centering is required.

In order to meet the foregoing erroneous factor of the drum, an attempt has been proposed wherein the scales for position signal are formed on the periphery of a drum to be detected.

In this way, even if error of the scale to be detected is minimized, another error in the mechanical system for driving the measuring object is further involved in. Accordingly, in the present state of art, it is generally understood that when reading information from each pitch on the scale by some means to obtain a position detecting signal based on the information, an error between two adjacent pitches as well as an error accumulated through the process of reading is unavoidable to a certain extent.

SUMMARY OF THE INVENTION

It is, therefore, an object of the present invention to provide a method for detecting a position in which a position detecting signal can be obtained on the basis of a certain distance without being affected by external factors by detecting the foregoing error of the scale to be corrected so that an accurate position detection can be performed based on an output signal which does not include any pitch error of the scale, thus solving the above-discussed problems of the prior arts.

In order to accomplish the foregoing object, a method for detecting a position in accordance with the present invention comprises a step of detecting a signal pitch by pitch, i.e., detecting each pitch by at least two detectors, said signal being outputted from a position detecting scale set to a measuring object moving relative to a measurement system to be read by photoelectric or magnetic means, a step of storing an output value of a part of the scale delivered from a first detector which precedingly detects a signal from the position detecting scale moving relative to the measurement system, a step of comparing the stored output value with an output value from a second detector which subsequently detects a signal from an area the same as said part, a step of outputting a position detecting signal when said two output values are coincident and a step of simultaneously storing an output value of the preceding first detector, said steps being repeated to obtain further position detecting signals to detect the position of the measuring object.

By arranging the foregoing method for detecting a position, a position detecting signal is outputted at the time when a signal of the part on which the preceding first detector has detected a signal from the scale has been detected by the second detector, the output value from the first detector is restored at the same time, and a position detecting signal is outputted again when the second detector has detected the same value as the restored value, and thereafter the position detecting signal is outputted every time when the output value of the first detector becomes equal to the output value of the second detector, in other words, the position detecting signal is outputted on the basis of a distance fixed between the first detector and the second detector, thereby signals of uniform pitch being outputted.

Other objects and features of the present invention will become apparent in the course of the following description in conjunction with the accompanying drawings.

DESCRIPTION OF THE PREFERRED EMBODIMENT

Figure 1:
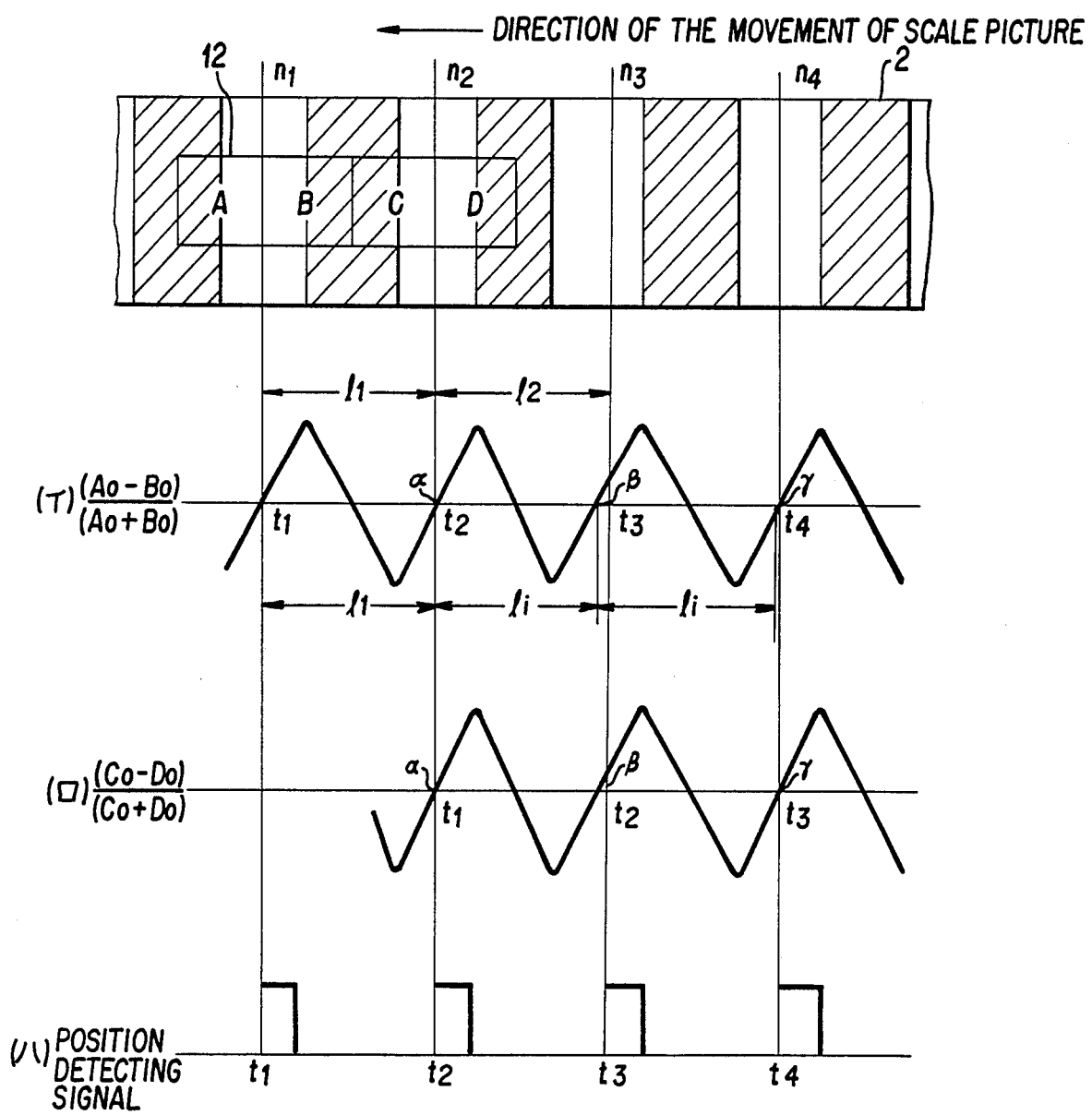
FIG. 1 is a diagram to explain the principle of a method for detecting a position according to the present invention.
Figure 2:
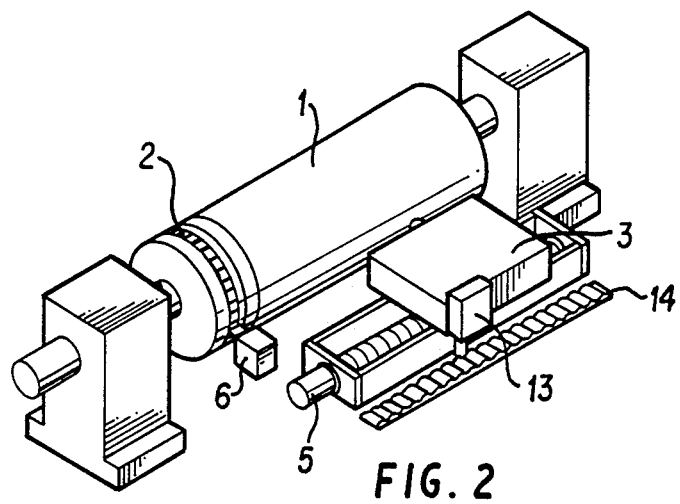
FIG. 2 is a perspective view of a rotary drum type scanner to which a method of the present invention is applied.
Figure 3:
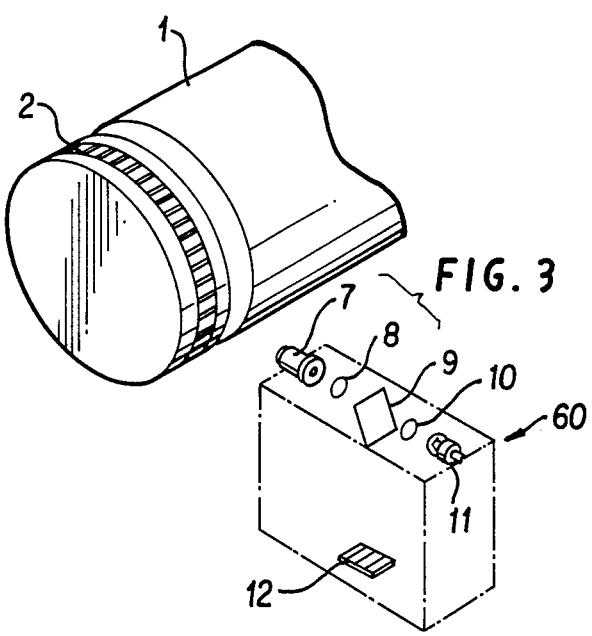
FIG. 3 is a perspective view to show typically an essential part of an optical system in FIG. 2.

Referring to FIGS. 1, 2 and 3 showing an embodiment of the present invention, a position detecting scale (2) in the rotating direction is formed on a periphery of a drum by corroding a surface of the drum through etching or the like so that a light is irregularly reflected on the etched portion while being regularly reflected on the non-etched portion. In this embodiment, the scale thus prepared is adapted to be optically read. A position detecting scale (14) in the subscanning direction is Similarly prepared and is also eptically read.

Prior to the description of the principle with reference to FIG. 1, an arrangement of one optical system of this embodiment is described referring to FIGS. 2 and 3.

In FIG. 2, a rotary drum (1) is driven by a drive motor not illustrated. In this connection, the drum is supposed to be rotated in the main scanning direction. A recording head (3) moves in the subscanning direction by a feed screw driven by a drive motor (5), i.e., in the direction parallel to the axis of the rotary drum (1). Any scale of a position detecting scale (2) is detected by a pickup head (6). This pickup head (6) emits light from a light source (11) on the scale (2) through an illuminating condenser lens (10), a half mirror (9), a $\frac{1}{4}\lambda$ plate (8) and an objective lens (7). An image on the scale (2) is focused on a line sensor (12), wherein four photoelectric elements are arranged, through the objective lens (7) and the half mirror (9). The $\frac{1}{4}\lambda$ plate (8) serves for preventing the light reflected from the scale from returning to the light source causing interference thereby. A pickup head (13) of a position detecting scale (14) disposed in the subscanning direction along the rotary drum (1) is also arranged in the same manner to read the scale (14), but in this case the scale (14) is fixed or stationary and the pickup head (13) is fixed to a recording head (3) to move together.

Figure 4:
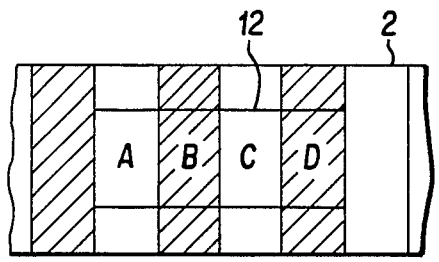
FIG. 4 shows a state wherein an image of a scale is focussed on a line sensor.

FIG. 4 shows a state wherein scales of the scale (2) are focused on the line sensor (12). A scale pitch on the formed image is made equal to a pitch of each photoelectric element of the line sensor (12) by adjusting lateral magnification of the image formed on the line sensor (12), i.e., by adjusting a ratio of a distance between the objective lens (7) and the surface of the scale (2) to that between the objective lens (7) and the line sensor (12). Oblique line portions of the formed image in FIG. 4 shows irregular reflection to which etching is applied and blank portions regular reflection.

Figure 5:
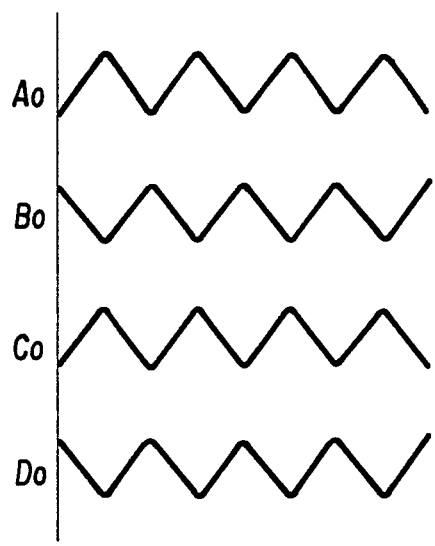
FIG. 5 shows wave forms of the line sensor.

FIG. 5 shows photoelectric outputs ($A_0$), ($B_0$), ($C_0$), ($D_0$) of the respective photoelectric elements (A), (B), (C), (D). They are outputted in the form of triangle waves since a black-and-white pattern moves on the rectangular sensor. These outputs are usually used as position detecting signals, but the scale pitch on the formed image is not perfectly coincident with the pitch of the sensor by the interference with pitch error of the scale as described above.

Referring now to FIG. 1, a principle on which a position detecting signal is outputted is described hereinafter. FIG. 1 shows how to process a signal from the line sensor (12) for the purpose of obtaining a position detecting signal not interfered with the pitch error of the scale. Each photoelectric element (A) (B) (C) (D) are divided into two groups in order of detection, i.e., one element group (D) (C) and the other (B) (A). When establishing outputs of these groups as ($D_0$) ($C_0$) and ($B_0$) ($A_0$) respectively and taking processing outputs $(C_0-D_0)/(C_0+D_0)$, $(A_0-o)/(A_0+B_0)$, triangular waves are drawn when moving the black-and-white pattern (2) in the direction of the arrow as shown in FIG. 1 (a) (b).

A position at the time the processing output $(A_0-B_0)/(A_0+B_0)=0$ is a position of gravity center since the black-and-white pattern pitch is made equal to the sensor pitch. If there is no pitch error of the scale, both of the processing output $(A_0-B_0)/(A_0+B_0)$ of the sensor group (A) (B) and the processing output $(C_0-D_0)/(C_0+D_0)$ of the sensor group (C) (D) adjacent to the group (A) (B) at a scale pitch will be zero at the position of the center of gravity. However, the processing outputs include actually some error since the pitch error and accumulation thereof are caused in the scale pattern itself.

An extent of deviation of a scale pitch of a detecting object with respect to a distance between the center lines of the sensors (A) (B) and the sensors (C) (D) can be successfully determined by reading a value of the processing output $(C_0-D_0)/(C_0+D_0)$ at the time when the processing output $(A_0-B_0)/(A_0+B_0)$ is zero in the relative movement of either the scale (2) or the line sensor (12).

In other word, an output value ($\alpha$) of the $(C_0-D_0)/(C_0+D_0)$ [i.e., a value at the time of $t_1$ in FIG. 1 (b)] read out at the moment the processing output $(A_0-B_0)/(A_0+B_0)=0$ [i.e., at the time of $t_1$ in FIG. 1 (a)] is the pitch error of the scale.

Thus according to the present invention, the processing output $(A_0-B_0)/(A_0+B_0)$ serves as a trigger while the output $(C_0-D_0)/(C_0+D_0)$ as a correction signal. Accordingly, in FIG. 1, a position detecting signal is outputted at the time $t_1$ when the processing output $(A_0-B_0)/(A_0+B_0)$ of the sensors (A) (B) showing a center of gravity of a part $n_1$ of the scale (2) is zero, and at the same time the value ($\alpha$) of the processing output $(C_0-D_0)/(C_0+C_0)$ of a part $n_2$ of the scale is fetched. Then the scale (2) moves in the direction of the arrow and the position detecting signal is outputted at the time $t_2$ when the processing output $(A_0-B_0)/(A_0+B_0)$ detected with respect to the part $n_2$ by the sensors (A) (B) is zero. And at the time $t_2$, a value ($\beta$) of the processing output $(C_0-D_0)/(C_0+D_0)$ of a part $n_3$ of the preceding sensors (C) (D) is fetched along with the movement of the scale (2). The position detecting signal is outputted when moving the scale to detect the part $n_3$ by using the sensors (A) (B) and the processing output $(A_0-B_0)/(A_0+B_0)$ thereof is ($\beta$). At the same time, a value ($\gamma$) of the processing output $(C_0-D_0)/(C_0+D_0)$ is fetched, and thereafter the position detecting signal is outputted in the same manner.

If there is some pitch error in the scale, the distance $l_1$ between the centers of gravity of two scales (i.e., the scale pitch) advances to $l_1'$, $l_1''$ producing different deviations as shown in FIG. 1 (a). Accordingly, the position detecting signal is outputted at the moment when the gravity center position of the following sensors pass through a point where the scale has been precedingly detected so that the output is obtained by every distance $l_2$ between the gravity center positions of the sensors. Since the distance $l_2$ between the sensors is always fixed and constant, any signal outputted on the basis of this constant distance is a signal of equal and uniform pitch available for the method of this invention.

Thus, the processing output serving as a reference for the following sensors is fetched as a trigger, while the processing output of the preceding sensors as a correction signal, the processing output of the following sensors is determined based on the correction signal to replace the scale pitch with the sensor pitch, each position detecting signal is outputted by every sensor pitch, and as a result such interference as scale pitch error, irregular moving speed of the scale or the sensors, etc. is perfectly and successfully shut off.

Figure 6:
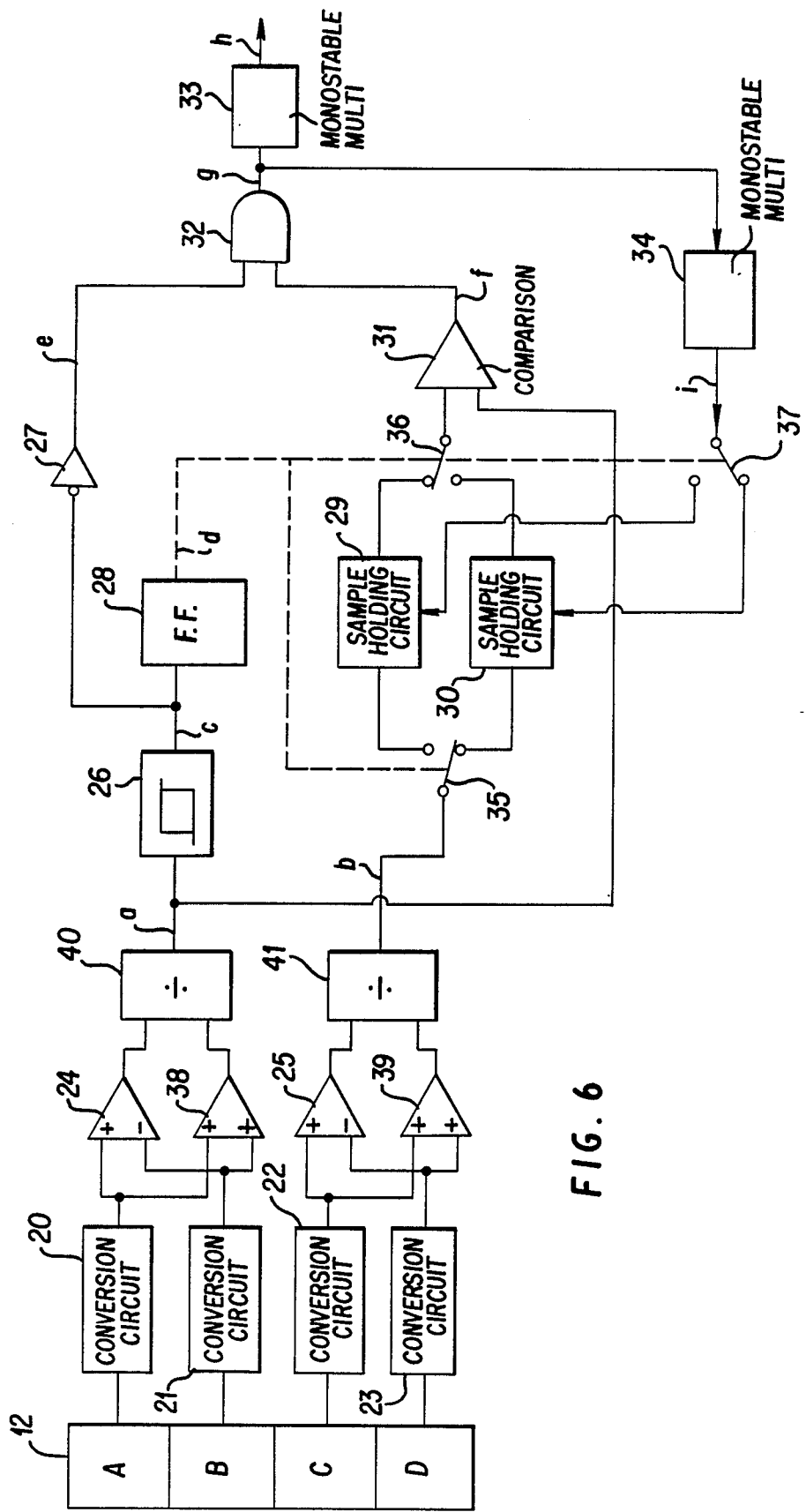
FIG. 6 is a block diagram showing an example of a circuit.
Figure 7:
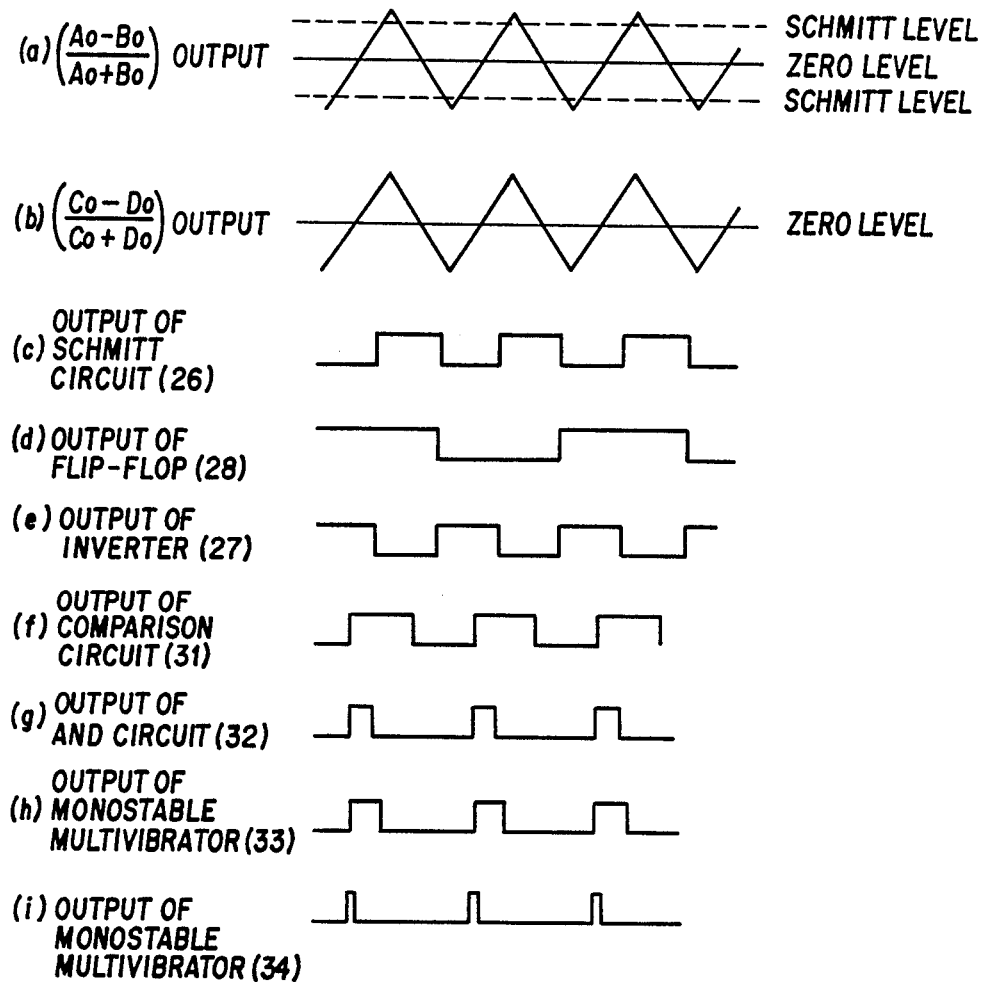
FIG. 7 shows wave forms as operating state of an essential part of the circuit in FIG. 6.

FIG. 6 is a block diagram showing a circuit system arranged based on the foregoing principle, and FIG. 7 shows wave forms of outputs of various parts. Output of each photoelectric element (A) (B) (C) (D) of the line sensor (12) is converted to a voltage signal by conversion circuits (20) (21) (22) (23) to enter in differential amplifiers (24) (25) and adding amplifiers (38) (39) and further delivered to dividing amplifiers (40) (41). Output (a) of the dividing circuit (40) enters in a Schmitt circuit (26) and a comparison circuit (31). On the other hand, output (b) of the dividing circuit (41) enters in either a sample holding circuit (29) or (30) by way of an analog switch (35). Output of the sample holding circuit (29) or (30) enters in the comparison circuit (31) by way of an analog switch (36). Output (c) of the Schmitt circuit (26) enters in an inverter (27) and a flip-flop (28). Output (d) of the flip-flop (28) makes on-off control of the analog switches (35) (36) (37). Output (e) of the inverter (27) and output (f) of the comparison circuit (31) enter in an AND circuit (32). Output (g) of the AND circuit (32) enters in monostable multivibrators (33) (34). Output pulse (i) for timing of the monostable multivibrator (34) enters either in the sample holding circuit (29) or (30) through the analog switch (37).

In the foregoing arrangement, when the processing output (a) of the sensors (A) (B) is zero, initial value of the sample holding circuit (29) is zero, and the comparison circuit (30) judges that both of them are zero. The "L" signal (c) of the Schmitt circuit (26) is inverted by the inverter (27) to be a "H" signal, which opens the AND circuit (32) to increase the processing output (a) of the sensors (A) (B). When this output (a) gets over zero, the output signal (f) is outputted as first transition signal from the comparison circuit (31) and the first transition signal (g) is outputted by way of the AND circuit (32). The monostable multivibrator (33) is driven by the first transition output to output the position detecting signal (h). The monostable multivibrator (34) is driven by the first transition output of the AND circuit (32), and the output pulse thereof is applied to the sample holding circuit (30) as a timing for sample holding by way of the analog switch (37). The processing output ("α" in FIG. 1) of the sensors (C) (D) at this moment is held in the sample holding circuit (30) through the analog switch (35). At the time of reducing the processing output (a) of the sensors (A) (B), the output of the flip-flop (28) is inverted by the first transition output of the Schmitt circuit (26) to switch the analog switches (35) (36) (37). The foregoing operation is now performed when the processing output (a) of the sensors (A) (B) is coincident with the value "α" held in the sample holding circuit (30) to output the position detecting signal and to hold a value "β" of the processing output (b) of the sensors (C) (D). The foregoing operation is repeated thereafter in the same manner.

In the embodiment described above, two pairs of sensors adjacent to each other are disposed corresponding to the scale pitches. This is because when obtaining the processing output of the sensors, a detection accuracy is improved by the detection of the gravity center positions of the scales.

Figure 8:
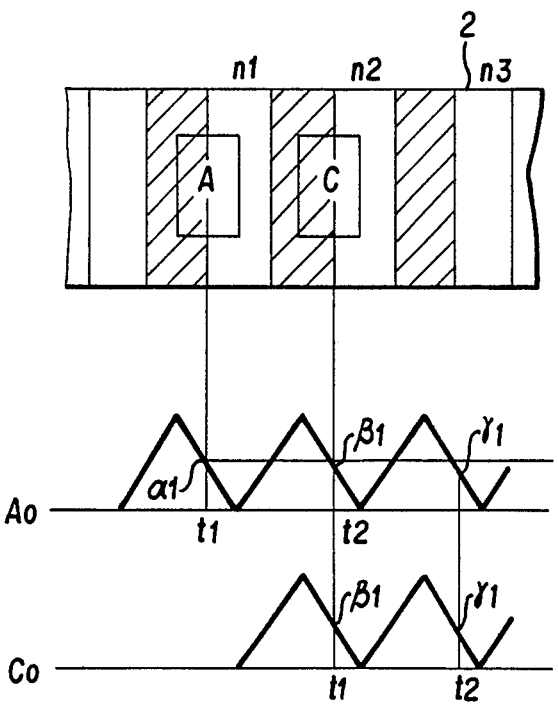
FIGS. 8 and 9 are diagrams to explain another embodiment.

Besides dividing operation is performed in order to correct nonuniformity or unevenness in the density of the scales. It is to be noted that when scale is formed by etching as in this embodiment, a high working accuracy is secured for the gravity center position than edge portions, and such characteristic is also utilized in this embodiment. Accordingly, the pitch error of the scales adjacent to each other is not so large that the accumulated pitches ($\alpha, \beta, \gamma \ldots$) do not get out of the straight line area of the triangle waves drawn by the differential signals when pitch errors are detected to be used as correction signals during one revolution of the rotary drum in this embodiment. In addition, in the case of less unevenness in the scale density, the adding multipliers (38) (39) and dividers (40) (41) are not required, and the outputs (a) (b) of the differential multipliers (24) (25) can be used as signals (a) (b). Furthermore, when the accuracy of the scale is high to a certain extent, it is possible to dispose two sensors (A) (C) at a distance of one pitch of the scale as shown in FIG. 8 to perform the processing as above described. In such arrangement, when the sensor (A) outputs a value ($\alpha_1$) for a scale part $n_1$ at the time $t_1$, output ($\beta_1$) of the sensor (C) for a part $n_2$ is fetched. The position detecting signal is outputted when the sensor (A) outputs the ($\beta_1$) for the part $n_2$ at $t_2$, and at the same time output ($\gamma_1$) of the sensor (C) for a part $n_3$ is fetched to perform the same processing thereafter to obtain the position detecting signal. In other words, when obtaining two signal for one pitch of the scale, the position detecting signal can be obtained by converting the sensor pitch fixed on the two signals to a reference signal.

If there is some irregularity in the moving speed of the scale, the output value $(C_0-D_0)/C_0+D_0$ at every time when the value (a) of the output $(A_0-B_0)/(A_0+B_0)$ is zero shows the irregularity between the scales.

Figure 9:
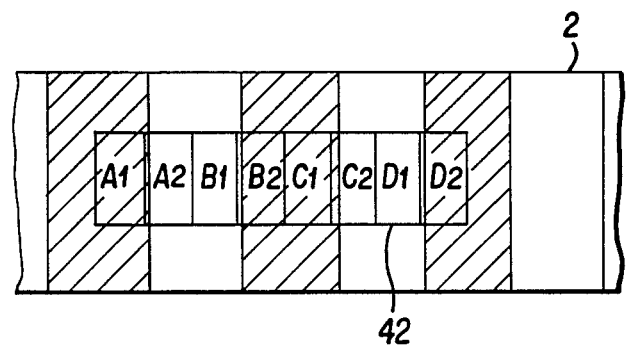

Furthermore, as shown in FIG. 9, it is possible to divide each sensor (A) (B) (C) (D) of FIG. 1 into sensor groups (or pairs) ($A_1$) ($A_2$), ($B_1$) ($B_2$), ($C_1$) ($C_2$), ($D_1$) ($D_2$) forming a line sensor (42). By using such line sensor (42), the same processing as FIG. 1 can be performed by adding outputs of these sensors ($A_1$) ($A_2$), ($B_1$) ($B_2$), ($C_1$) ($C_2$), ($D_1$) ($D_2$) and obtaining difference output thereof. Furthermore, by obtaining a difference output of each added output of the sensors ($A_2$) ($B_1$) and ($B_2$) ($C_1$) as well as a difference output of each added output of the sensors ($A_1$) ($B_1$) and ($B_1$) ($B_2$), it is possible to obtain an output signal with deviation of ¼ pitch (phase difference 90°) so that the moving direction of the scale is discriminated by detecting the advance or delay of the phase.

In the embodiment described above, the scale is read by optical means, but such magnetic means as hall device can be also available for the reading. In effect, any signal can be used so far as variation of the scale is detected thereby.

In the arrangement shown in FIG. 2, the pickup head (13) is attached to the head (3) and the position detecting scale (14) is fixed, but it is also possible to attach the position detecting scale (14) to the head (3) and fix the pickup head (13) for the relative movement. The method according to this invention is further available for original picture scanning input.

Thus, by the position detecting method according to the present invention, the signal obtained corresponding to the scale pitch is fetched as error detecting signal by detecting the error between the pitches adjacent to each other, the fetched signal serving as a correction signal is converted to an uniform and equal pitch signal corresponding to a distance established between two detectors disposed for detecting the same part of the scale to be outputted and the output signal is used as a position detecting signal, and as a result a highly accurate detection of position is attained without interference with the pitch error of the scales. Furthermore, when the moving speed of the scale is not constant, the output value $(C_0-D_0)/(C_0+D_0)$ at the time the output $(A_0-B_0)/(A_0+B_0)$ is zero always represents the irregularity of the scale, whereby such irregularity can be exactly detected.

In addition, the method according to the present invention is applicable when two different types of signals from the scale are to be detected. In this way, the method according to the present invention can be applied to wide range of position detecting operation.

We claim:

1. A method for detecting a position comprising a step of detecting by at least two detectors, including a preceding and following detector, a signal at every pitch of a scale, comprising the steps of:
   reading a position detecting scale by photoelectric or magnetic means including and detectors,
   storing an output from the preceding detector,
   later storing the present output value of the preceding detector at a time when the following detector comes near a scale position on which the output valve of the preceding detector, which had earlier been stored, and the present output of the following detector becomes equal, and
   outputting a position detecting signal in response to detecting substantial equality of the earlier stored valve and the present output of the following detector, said steps being repeated.

2. A method for detecting a position as claimed in claim 1, wherein said detecting step comprises
   detecting a signal being outputted from a position detecting scale at each pitch by four detectors, and said step of storing anew comprises storing a processing output value of two preceding detectors when a processing output value of two following detectors comes near a scale position on which the processing output value of the preceding two detectors has been stored and becomes substantially equal to the processing output value of the preceding two detectors.

3. A method for detecting a position as claimed in claim 1, said detecting step comprising a step of detecting a signal being outputted from a position detecting scale at each pitch by four detectors, and further comprising a step of using signals obtained by the combination of outputs of the respective detectors as an output of the preceding detectors, an output of the following detectors and an output of the detectors of phase difference.

4. A method for detecting a position as claimed in any of claim 1, comprising a step of obtaining an output value of the following detector whenever an output of the preceding detector attains a preliminarily fixed value, and a step of using an irregularity of the output values as an irregularity of the scale pitch.

5. In a method of position detection by reading a graduated scale, the improvement comprising a method for accurately detecting a position independent of adjacent pitch error of scale graduations, including the steps of:
   (a) detecting adjacent pitch error and providing an error detection signal representative thereof;
   (b) providing an error correction signal by converting said error detection signal to an equal pitch signal corresponding to a predetermined distance between at least two detectors disposed for detecting a same part of said scale;
   (c) using said correction signal as a position detecting signal.

6. An improved method as in claim 5, wherein:
   said detecting step comprises detecting a signal from a position detecting scale by a plurality of detectors;
   said providing step comprises:
      storing an output value of a first of said detectors,
      comparing an output value for a position on said position detecting scale, outputted from a second of said detectors, with the stored output value from the first detector for the same position on said position scale, and
   wherein said using step comprises outputting a position detecting signal from said position detecting scale when the two compared output values are substantially equal.

7. An improved method as in claim 6 wherein said providing step further comprises the step of
   storing said output value from the first detector again when the two compared output values are substantially equal.

8. An improved method as in claim 7 wherein said using step comprises the step of outputting a further position detecting signal again when the output signal from said second detector equals the stored again output value from the first detector.

9. An improved method as in claim 5 wherein said converting step of said providing step comprises adjusting magnification of an image of said graduated scale formed on a line sensor to have a same pitch as a pitch between said plurality of detectors forming said line sensor.

10. An improved method as in claim 5 wherein said converting step comprises the further step of obtaining first sums and differences of output signals of a first pair of detectors and using said first sums and differences as a trigger signal;
   obtaining second sums and differences of output signals of a second pair of detectors and using said second sums and differences as a correction signal;
   outputting a position detecting signal when said trigger signal attains a first predetermined value;
   obtaining a value of said correction signal for a portion of said graduated scale detected by said second pair of detectors at a time when said position detecting signal is outputted;
   relatively displacing said graduated scale and said line sensor to locate said first pair of detectors on said portion of said graduated scale previously detected by said second pair of detectors, thereby locating said second pair of detectors on a new portion of said graduated scale;
   outputting said position detecting signal again when the value of said trigger signal for said portion of said graduated scale attains a value substantially equal to the value of said correction signal previously obtained by said second pair of detectors for said portion; and
   repeating said steps of obtaining, relatively displacing, and outputting to provide further outputs of the position detecting signal.

* * * * *